Oct. 7, 1941.  J. L. KIMBALL  2,258,457
THERMOSTAT
Filed Jan. 11, 1940
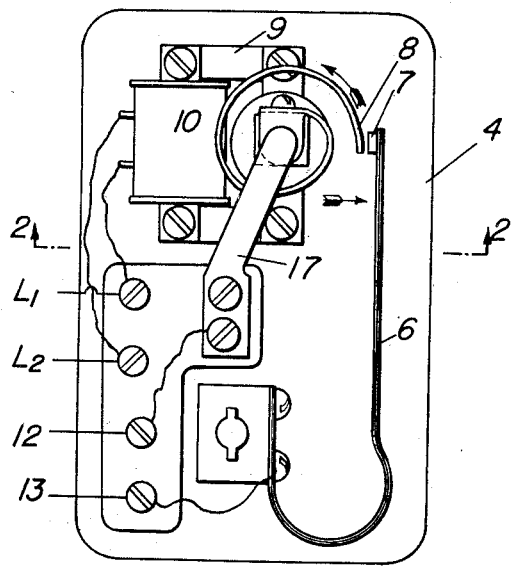
FIG. 1
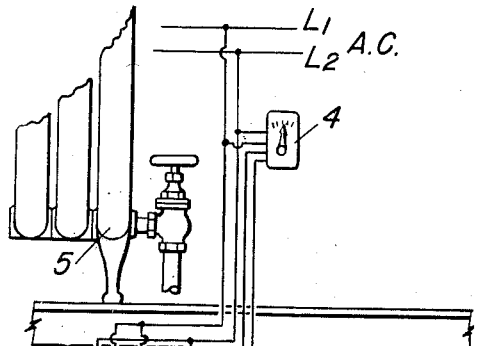
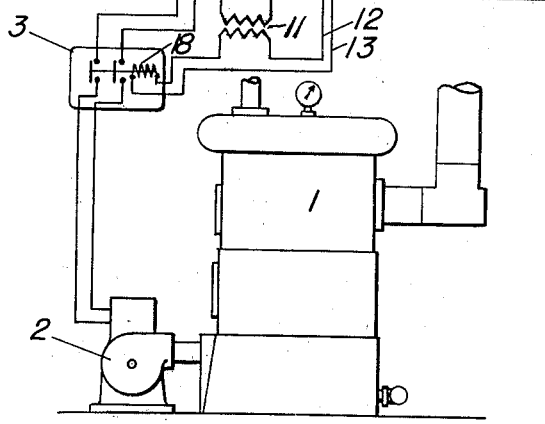
FIG. 2
FIG. 3
INVENTOR.
James L. Kimball Patented Oct. 7, 1941

2,258,457

UNITED STATES PATENT OFFICE 2,258,457

THERMOSTAT

James Lewis Kimball, Danvers, Mass., assignor to Ruggles-Klingemann Mfg. Co., Salem, Mass.

Application January 11, 1940, Serial No. 313,419

2 Claims. (Cl. 200—139)

My invention relates to thermostatic control for domestic oil burner heating systems and the like and has for its common object the elimination of over and under heating due to heat transfer lag of the system under control.

A further object of my invention is to provide a thermostat having a wiping contact with an abrupt breaking point thus insuring a more satisfactory make and break contact than that of the conventional type.

To accomplish these objects I provide a thermostat having a uniform cycling operation in which the heat supply periods are relatively near together with the length of the heat supply period varying in each cycle of operation in accordance with variations in the rate of heat dissipation. More specifically, I provide a thermostat having a rotating wiping contact member adapted to engage the heat responsive element of the thermostat for variable lengths of time, in each cycling period, which is proportional to the departure of the temperature from a predetermined normal value. The maximum contacting period being limited in each cycling period to not exceeding the heat dissipated in the entire cycling period, which includes the off period.

In any properly proportioned domestic heating system, the capacity of the heat generating apparatus should be capable of effecting some degree of over heating even under a maximum heat requirement condition, consequently, in mild weather as in early fall or late spring the heating apparatus when controlled by the ordinary conventional thermostat results in alternate over and under heating periods due to heat transportation lag of the system.

With applicant's invention the oil burner would be ignited for comparatively short periods of time in each cycle of operation, and this would be true, in a steam heating system, even though the temperature of the water in the boiler was below the steam generating point, whereas, with the conventional thermostat the contacts would be maintained and the heater operated at full capacity, to first raise the temperature of the water to its boiling point from a comparatively cold boiler and then transmitting the steam to the radiators and a further delay in bringing the space to be heated up to the setting of the thermostat, the result is over heating due to excessive heat in transit.

With applicant's invention the temperature starting from a cold boiler is not only brought up more gradually, but the non-heating periods in each cycle of operation allows time for the heat input, after the generating point has been reached, to become equalized before proceeding to a further operation of the burner.

Applicant's invention is of even greater advantage with oil burner control of hot water heating system due to the fact that the transportation lag in such systems is much more sluggish than with steam and consequently the system is not so responsive.

The foregoing and other features of my invention will be better understood from the following description with reference to the accompanying drawing.

In the accompanying drawing, Fig. 1 illustrates a preferred embodiment of my invention. Fig. 2 shows a plan view of the same. Fig. 3 is a diagrammatic illustration of the application of my invention to an oil burning heater having pipe connection to a radiator located in the space the temperature of which it is desired to control. In this illustration, 1 designates a conventional oil burning furnace. 2 illustrates the usual type of oil burner for heating the furnace. 3 designates a magnetic relay switch for starting and stopping the oil burner operation. 4 designates the thermostat for controlling the temperature within the space in which it is located, and 5 represents a radiator for heating the space in which the thermostat is located.

Referring now to Fig. 1, a temperature responsive element 6 is of the usual bi-metal type in which contacting point 7 moves in the direction indicated by the arrow on an increase in temperature.

A wiping contacting strip indicated as 8 is periodically rotated by a clock motor 9, preferably every half hour when used in connection with domestic oil burner applications, although other timing periods may be used without departing from the scope of the invention. Coil 10 of motor 9 is adapted to be continuously energized by current from L1 and L2 as shown in Fig. 3.

A control circuit is taken from L1 and L2 through transformer 11 and provides low tension current on lines 12 and 13 for energizing magnetic coil 18 from room thermostat 4.

Referring again to Fig. 1, it will be noted that rotary contact member 8 is driven from shaft 14 of motor 9 but is electrically insulated therefrom by insulating block 15.

The shaft 14 has its speed reduced to one revolution for every 30 minutes by means of speed reduction gear represented as 16. A lead-in brush 17 allows electric current to pass from 12 to rotary contact strip 8 and back to 13 whenever contact 7 engages rotary brush 8. It will be noted that rotary brush 8 has a spiral contacting surface receding substantially uniformly outward with respect to its center position about which it revolves.

This arrangement permits contact 7 to engage rotary brush 8 for variable length of time in each cycle of operation which is proportioned to a drop in temperature from a predetermined high value at which it is desirable to maintain the temperature of the space to be heated. It should be understood that at the end of each heating period there is a quick break of the control circuit as the contact 7 falls off the end of rotary brush 8.

This quick break of the control circuit is accentuated due to a coiling and uncoiling effect produced by a drag on contact strip 8 when in engagement with contact 7.

A preferred arrangement is to construct contact strip 8 of relatively thin spring metal and in this way provide for a rapid opening of the contacts as coil strip 8 springs away from contact 7 when released at the end of each contacting period.

The time period between the breaking of the contacts 7 and 8 and the time contact is again made, allows the result of the last burner operation to become effective at the thermostat before proceeding to a further operation and thereby compensate for time and transportation lag and thus avoid over heating.

In the operation of my invention, whenever the space in which the radiator and thermostat is located drops below a predetermined desired temperature contact is made between 7 and 8 and this continues for a period of time which is proportioned to the drop in temperature. This causes the operation of magnetic switch 3 by the energizing of coil 18 which in turn starts the fan motor of the oil burner 2. It will be understood that there are other electrical connections not shown such as the ignition circuit and over heating relay. At the termination of the heating period there is a period of wait regardless of whether the temperature has been returned to normal or not, which allows the temperature of the space to become equalized before the next heating period.

Assuming a wide drop in temperature then there would be several of such heating periods before the temperature was returned to normal, but each succeeding heating period would be relatively shortened until operation ceased entirely.

Likewise, should the temperature of the space continue to drop calling for more and more heat, then each succeeding burner period would be increased until the downward fall in temperature was arrested after which the burner periods would be progressively shortened as the temperature was returning to normal.

It will be understood that as the heating periods are shortened the periods of wait are proportionally lengthened, the theory being that the time lag will be greater with small changes in heat supply than with larger changes, and consequently the off period must be longer to allow the system to become equalized.

Adjustments for higher or lower setting is effected by rotating insulating block 19 by means of the indicating pointer on the outside of the thermostat casing shown at 4 in Fig. 3.

While I have described the novel features of my invention in detail and illustrated its application in relation to a domestic oil burning heater, I wish to have understood that the invention is not limited to this precise application or to the exact arrangement disclosed but has other practical application in which the control of temperature is involved and may include equivalent elements.

For example, a pressure type of thermostat comprising a metal bellows, or diaphragm, actuated by the expansion of a volatile liquid are within the scope of the appended claims.

I claim:

1. In a thermostat, a circuit closing contact element responsive to variations in temperature, a continuous rotating contacting member cooperating therewith said rotating contacting member comprising a spiral wound flat spring of relatively thin material adapted to coil when contacted with and uncoil when released from said contact, and means to rotate said contacting member to engage the temperature responsive element for variable length of time in each cycle of operation in accordance with variations in temperature within a cycling period.

2. In a thermostat, a circuit making and breaking contact element responsive to variations in temperature, a continuous rotating contact member cooperating therewith, said member comprising a spiral wound flat spring of relatively thin material adapted to coil when contacted therewith and uncoil when released from said contact and a synchronous motor adapted to drive said contacting member to thereby engage said temperature responsive element for variable lengths of time in each cycle of operation, which is proportional to the degree of actuation of the temperature responsive element.

JAMES LEWIS KIMBALL.